J. O. MORRIS.
CLIP.
APPLICATION FILED DEC. 10, 1918.
1,322,461.
Patented Nov. 18, 1919.
2 SHEETS—SHEET 1.
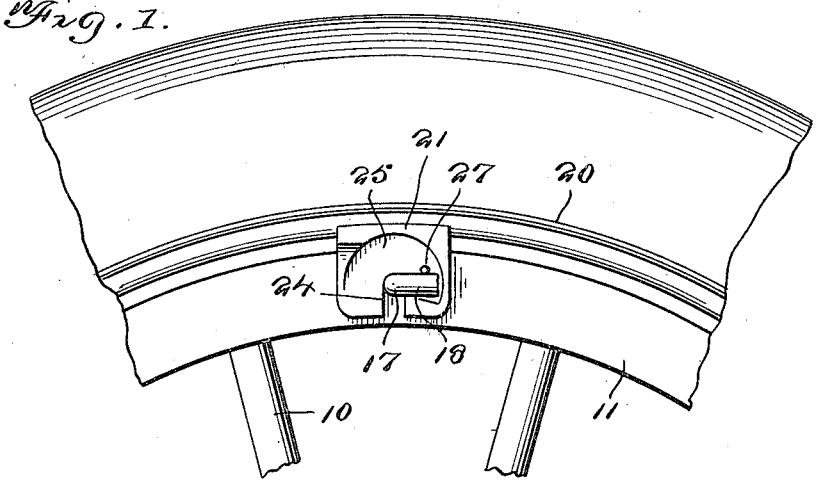
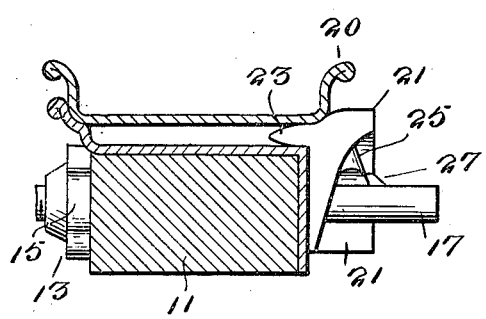
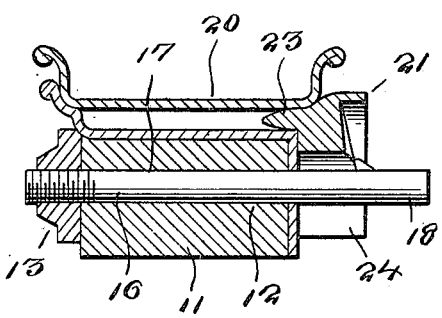
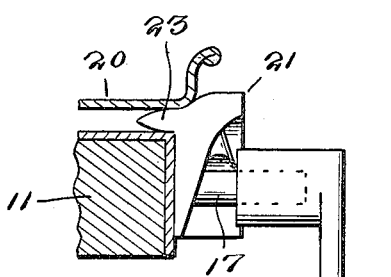
Inventor
J. O. Morris
By Victor J. Evans
Attorney
Witnesses
E. R. Ruppert.

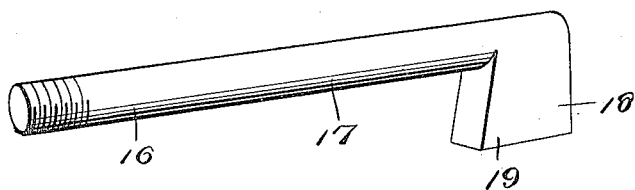
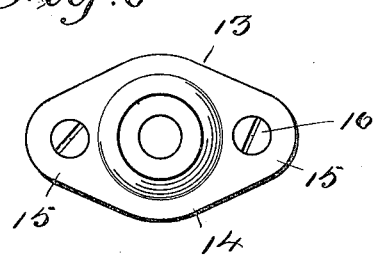
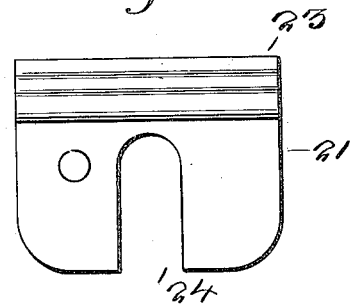
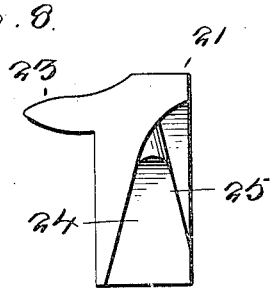
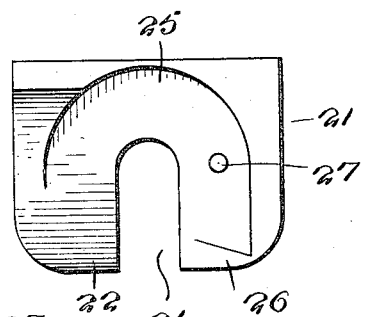
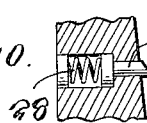

UNITED STATES PATENT OFFICE.

JOHN O. MORRIS, OF RUTH, NEVADA.

CLIP.

1,322,461.   Specification of Letters Patent.   Patented Nov. 18, 1919.

Application filed December 10, 1918. Serial No. 266,083.

*To all whom it may concern:*

Be it known that I, JOHN O. MORRIS, a citizen of the United States, residing at Ruth, in the county of White Pine and State of Nevada, have invented new and useful Improvements in Clips, of which the following is a specification.

This invention has reference to a means for facilitating the arrangement of a rim on the felly of a wheel and for retaining the rim thereon.

The improvement contemplates the employment of a clip designed to contact with one edge of the rim of a wheel, and having means associated therewith for moving the clip below, but gradually toward the side of the felly to arrange the rim on the said felly, the said means also locking the clip to prevent any outward movement thereof.

A further object of the invention is to produce a device of this character which shall be of a comparatively simple nature, easily applied to any ordinary construction of wheels, and thoroughly efficient and positive in operation.

Other objects and advantages will appear as the nature of the invention is better understood, reference being had to the accompanying drawings, in which:

Figure 1 is an elevation of a portion of a vehicle wheel provided with the improvement.

Fig. 2 is a sectional view approximately on the line 2—2 of Fig. 1, upon an enlarged scale.

Fig. 3 is a similar sectional view approximately on the line 3—3 of Fig. 1.

Fig. 4 is a detail sectional view illustrating the manner in which the locking dog is released from engagement with the head of the bolt member, when the bolt is to be turned to release the clip, as when the tire is to be removed from the wheel.

Fig. 5 is a perspective view of the bolt member.

Fig. 6 is a plan view of the nut for the bolt which is secured on the inner side of the felly of the wheel.

Fig. 7 is a view of the clip looking toward the inner face thereof.

Fig. 8 is an end view of the washer.

Fig. 9 is a face view of the washer.

Fig. 10 is a fragmentary sectional view through the clip in a line with the spring influenced dog.

In the drawings a portion of a wheel for an automobile is indicated by the numeral 10. At desired spaced intervals the felly 11 of the wheel is provided with transverse openings 12. Upon the inner face of the felly, opposite each of the openings 12 is a nut 13 having its bore alining with the said opening. The nut preferably comprises a flat body portion 14 or is otherwise formed upon its opposite sides with ears 15 having openings therethrough for the reception of headed securing elements, such as screws 16.

Passing through each of the openings 12 and adapted to engage with the threaded bore of the nut 13 is the shank 16 of a bolt member 17. The shank, for the major portion thereof is non-threaded and has its end, opposite that provided with the threads formed with a lateral extension or head 18. The head comprises a substantially rectangular member and has its inner end cut or formed at an inclination as indicated by the numeral 19.

The clip members which are designed to force the rim 20 on the felly and to retain the same thereon are each indicated by the numeral 21. Each of the clips includes what I will term a body portion 22 that has its inner face straight and its upper edge provided with an outstanding wedge-shaped flange 23 that engages between the felly and the tire carrying flange and is designed, when the clip is moved in the direction of the felly, in a manner which will presently be described, to force the flange on the felly and to retain the same on the felly. The body portion 22 of each of the clips is comparatively thick and is provided with an elongated slot 24 entering from the lower edge thereof and designed to be arranged over the shank of the bolt. The outer face of each of the clips is provided with a spiral depression 25, the outer end wall of which terminating in a shoulder 26, the said shoulder being arranged upon the thickest portion of the body of the clip, it being noted, by reference to the drawing, that the outer face of the clip, at the beginning of the spiral depression 25 is preferably cut away or is concaved from its outer and upper corner to its lower edge. Inward of the shoulder 26 is arranged a pocket having therein a dog 27 that is normally projected outward therefrom by a spring 28, the pocket being of two dimensions and the dog being likewise of two dimensions so that the shoulder on the dog, contacting with the shoulder between the smaller and larger passages of the pocket will be limited in an outward direction. The pocket is closed by a plug or the like and this plug provides one of the contact members for the spring, the other end of the spring contacting with the enlarged inner end of the dog. The dog has an outer beveled face 29.

In practice the clip is arranged on the bolt. The bolt is then turned, preferably through the medium of a brace, as illustrated in Fig. 4 of the drawings so that the beveled face 19 thereof will travel over the spiral surface 25. The cam engagement between the beveled face of the head of the bolt and the substantially cam-shaped wall provided by the surface 25 will force the clip bodily toward the side of the felly, moving the rim onto the felly. When the bolt head is brought against the shoulder 26 at the outer and wider end of the cam or spiral shaped surface 25 the same will have passed over the beveled end of the dog, permitting the spring to force the dog outwardly and lock the bolt on the clip. By the employment of a brace as disclosed in the drawings, the socket thereof when arranged over the head of the bolt will contact with the dog, forcing the same inward of its dog against the pressure of its spring, and permitting the head of the bolt to travel over the cam or spiral surface beyond the dog, thus releasing the clip from engagement by the bolt.

Having thus described the invention, what is claimed as new, is:—

1. In a device for the purpose described, the combination with the felly of a wheel and a rim partly positioned on said felly and designed to be wholly arranged over the felly, of longitudinally movable headed members arranged transversely of the felly, a clip loosely positioned on each of said members and contacting with the rim, and said clips each having a spiral face over which the face of the said members are designed to travel to force the clips bodily against the felly and to position the rim on the felly.

2. In a device for the purpose described, the combination with a wheel felly and a tire carrying rim partly arranged on said felly and adapted to be wholly positioned thereover, of bolt members passing transversely through the felly, nuts secured to the felly and engaging the bolts each of said bolts having a laterally arranged head provided with an inner beveled face, clips each having a slotted body designed to be arranged on the shank of the bolts, each of said clips having a flange designed to contact with the tire carrying rim, and the outer face of the clips having a spiral depression therein over which the inclined face of the bolts is designed to travel, when the bolts are screwed in the nut, to force the clip in the direction of the felly and to bring the rim on the felly.

3. In a device for the purpose described, the combination with a wheel felly and a tire carrying rim partly arranged on said felly and adapted to be wholly positioned thereover, of bolt members passing transversely through the felly, nuts secured to the felly and engaging the bolts, each of said bolts having a laterally arranged head provided with an inner beveled face, clips having a slotted body designed to be arranged on the shank of the respective bolts, each of said clips having a flange designed to contact with the tire carrying rim, and the outer face of each of said clips having a spiral depression therein over which the inclined face of the co-engaging bolt is designed to travel, when the bolt is screwed in the nut, to force the clip in the direction of the felly and to bring the rim on the felly, and a spring influenced dog carried by each of the clips and designed to engage with the bolts for locking the bolts on the clips when the bolt heads have traveled over the said spiral faces of the clips.

In testimony whereof I affix my signature.

JOHN O. MORRIS.